F. B. YOUNG.
PHOTOGRAPH PRINTING FRAME.
APPLICATION FILED JAN. 28, 1915.
1,174,790.
Patented Mar. 7, 1916.
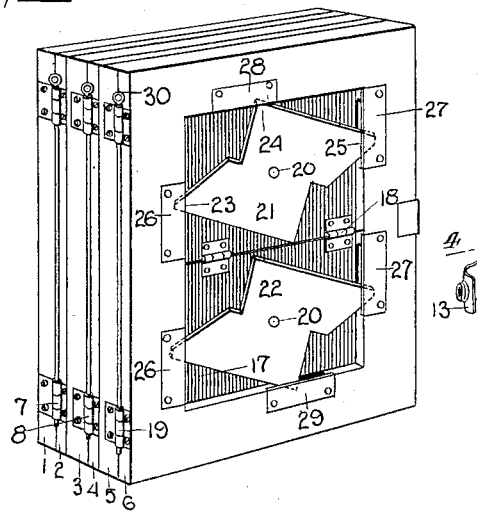
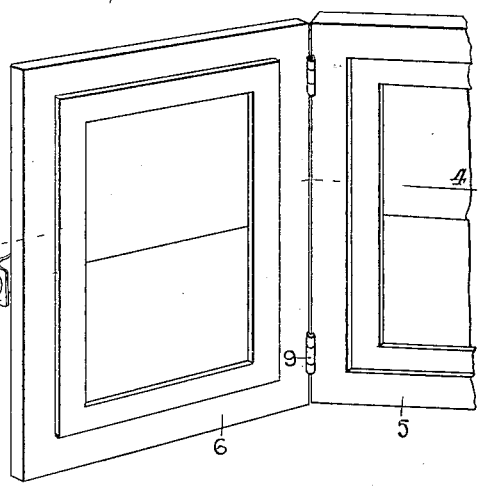
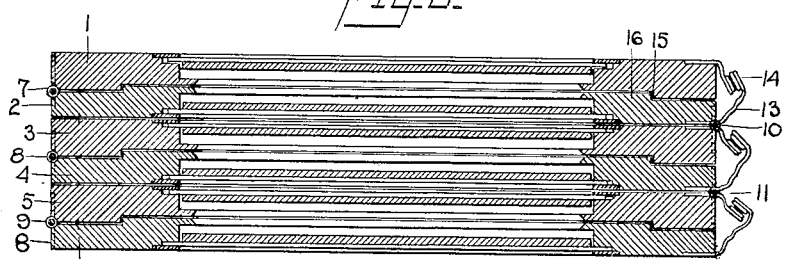
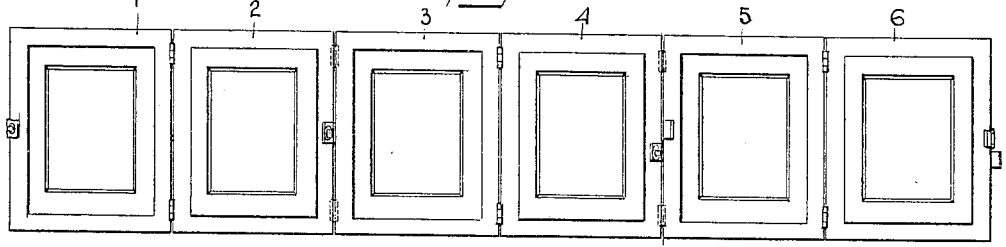
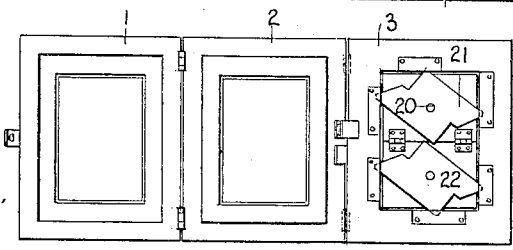
WITNESSES
Wm P. Goebel.
A. L. Kitchin.
INVENTOR
Frances B. Young
BY Munn & Co
ATTORNEYS
THE COLUMBIA PLANOGRAPH CO., WASHINGTON, D. C.

UNITED STATES PATENT OFFICE.

FRANCES BURROWS YOUNG, OF PITTSBURGH, PENNSYLVANIA.

PHOTOGRAPH-PRINTING FRAME.

1,174,790. Specification of Letters Patent. Patented Mar. 7, 1916.

Application filed January 28, 1915. Serial No. 4,354.

*To all whom it may concern:*

Be it known that I, FRANCES B. YOUNG, a citizen of the United States, and a resident of Pittsburgh, in the county of Allegheny and State of Pennsylvania, have invented a new and Improved Photograph-Printing Frame, of which the following is a full, clear, and exact description.

This invention relates to improvements in plate holders, and particularly to what are known as printing frames, or printing photographic holders, and has for an object to provide an improved arrangement wherein one or any desired number of pictures may be exposed at a time.

Another object of the invention is to provide a printing frame with a back formed with retaining members which may be readily applied and removed, the same being depressed and arranged so as to not project beyond the face of the frame whereby a number of frames may be stacked or assembled together.

A further object of the invention is to provide a plurality of printing frames hinged together and constructed so as to fold over in such a manner as to substantially interlock and present a comparatively solid assemblage of frames with plates suspended therein.

A still further object of the invention is to provide a plurality of frames so connected together as to allow the use of one or any number of the frames at any time.

In the accompanying drawings—Figure 1 is a perspective view of a plurality of frames folded or assembled; Fig. 2 is a perspective view of a pair of frames open, one of the frames being broken away; Fig. 3 is a transverse section through a plurality of frames folded or assembled; Fig. 4 is a section through Fig. 2 on line 4—4, the same being on an enlarged scale; Fig. 5 is a plan view of the frame shown in Fig. 3, the same being on a reduced scale, and in an extended or unfolded position; Fig. 6 is a plan view of a plurality of printing frames with two shown ready for use.

Referring to the accompanying drawings by numerals, 1, 2, 3, 4, 5 and 6 indicate frames hinged together by suitable hinges. It will be observed that hinges 7, 8 and 9 are arranged on one side while hinges 10 and 11 are arranged on the opposite side of the frames when assembled as shown in Fig. 3. This allows the frames to be either assembled as shown in Figs. 1 and 3 or unfolded as shown in Fig 5. It also allows one or more of the frames to be used as shown in Fig. 6. In order that the frames may be properly held together when folded flexible members 12 and 13 are connected by a suitable clasp 14. The flexible members may be of any desired material, such as cloth or leather, and are secured in place by any suitable means, as for instance, tacks or adhesive. A similar arrangement is provided for frames 3 and 4, and also for frames 5 and 6. By folding the frames in this manner the backs of the outside frames are arranged exteriorly and thereby protect any films, plates or other matter in any of the frames. It will also be observed that each frame is provided with a depression 15 and a raised portion 16, the respective raised portions 16 fitting into the respective depressions 15 when the parts are assembled as shown in Fig. 5 and thereby providing a light-proof joint. The backs also are clamped tightly in place and provide light-proof covers so that a sensitive plate or a piece of sensitive paper in any of the frames will be properly preserved when the frames are folded. Each of the frames is provided with a back 17, formed of two sections connected together by suitable hinges 18. Each section of the back 17 is provided with a pin 20, upon which locking members 21 and 22 are rotatably mounted. Each of these members is provided with engaging points 23, 24 and 25, points 23 and 25 projecting into notches in opposite sides of the frame where they are held by suitable strips 26 and 27. The extension 24 projects into notches in the frame, which notches are covered by strips 28 and 29. By arranging a device as just described one or two pictures may be printed at one time or a large number of pictures may be printed at one time. In the drawing the frames have been hinged together in such a manner that the backs on the outside frames will be arranged exteriorly and thereby protect anything within any of the frames. The hinges which connect the various frames together may be of any desired type, but are preferably arranged with pintles 30 which extend from one hinge to the other, as for instance from a top hinge to a bottom hinge, or vice versa, as shown in Fig. 1. This allows the quick easy removal of any of the pintles and consequently the disengagement of any of the frames from the assembled group. It will be of course evident that each of the frames is provided with an overhanging flange 31 (Fig. 4) against which the usual photographic plate 32 rests. On top of the photographic plate 32 is arranged the sensitive paper 33, and finally the back 17 which is held in place as heretofore described. If it is desired to print from films, a clear glass plate 32 is provided and both the film and the sensitive paper are placed thereon and finally the back 17.

What I claim is—

1. In a device of the character described, a plurality of printing frames, hinges for securing the same together, said hinges being arranged so that the outside frames will have their backs arranged exteriorly, and means for locking said frames together in pairs.

2. In a device of the character described, a plurality of pairs of frames, one frame of each pair being formed with a depression and the other frame of each pair being formed with a raised portion for fitting into said depression, a hinge for each pair of frames for connecting the same together, said hinges being arranged on one edge of the frame, and means arranged on the opposite edge of said frames to said hinges for locking the frames together in pairs.

3. In a device of the character described, a plurality of pairs of frames adapted to be folded together or nested, each pair being hinged together and to the next adjacent pair, one frame of each pair being formed with a depression and the other frame of each pair being formed with a raised portion to fit into said depression when the frames are nested, whereby light cannot penetrate into the frames, and means for holding the various frames in their folded or nested position.

In testimony whereof I have signed my name to this specification in the presence of two subscribing witnesses.

FRANCES BURROWS YOUNG.

Witnesses:
 GEO. S. WILSON,
 FRANK GRECO.

Copies of this patent may be obtained for five cents each, by addressing the "Commissioner of Patents, Washington, D. C."